(12) United States Patent
Elmaleh

(10) Patent No.: US 7,660,573 B2
(45) Date of Patent: Feb. 9, 2010

(54) INFRASTRUCTURE FOR WIRELESS TELECOMMUNICATION NETWORKS

(76) Inventor: David R. Elmaleh, 38 Hartman Rd., Newton, MA (US) 02459

( * ) Notice: Subject to any disclaimer, the term of this patent is extended or adjusted under 35 U.S.C. 154(b) by 60 days.

(21) Appl. No.: 11/404,644

(22) Filed: Apr. 14, 2006

(65) Prior Publication Data

US 2007/0243877 A1 Oct. 18, 2007

(51) Int. Cl.
*H04W 4/00* (2006.01)
(52) U.S. Cl. ................. 455/406; 455/443; 455/446; 370/338
(58) Field of Classification Search ............ 455/405, 455/406, 414.1, 422.1, 426.1, 443, 444, 445, 455/446, 449, 450, 451, 452.1, 454, 464, 455/524, 526, 550.1, 553.1, 561; 370/310, 370/331, 328, 338
See application file for complete search history.

(56) References Cited

U.S. PATENT DOCUMENTS

| | | | | |
|---|---|---|---|---|
| 6,804,219 | B2 * | 10/2004 | Koo et al. | 370/335 |
| 6,985,432 | B1 | 1/2006 | Hadad | |
| 7,043,225 | B1 * | 5/2006 | Patel et al. | 455/405 |
| 2002/0085645 | A1 | 7/2002 | Hadad | |
| 2002/0098870 | A1 * | 7/2002 | Kashiwagi et al. | 455/561 |
| 2003/0119480 | A1 * | 6/2003 | Mohammed | 455/411 |
| 2004/0087327 | A1 * | 5/2004 | Guo | 455/522 |
| 2004/0224691 | A1 * | 11/2004 | Hadad | 455/442 |
| 2005/0002323 | A1 | 1/2005 | Hadad | |
| 2005/0009505 | A1 * | 1/2005 | Triebel | 455/411 |
| 2005/0025042 | A1 | 2/2005 | Hadad | |
| 2005/0089052 | A1 * | 4/2005 | Chen et al. | 370/401 |
| 2005/0186959 | A1 * | 8/2005 | Vialen et al. | 455/432.1 |
| 2005/0207334 | A1 | 9/2005 | Hadad | |
| 2005/0207446 | A1 | 9/2005 | Hadad | |
| 2005/0288027 | A1 * | 12/2005 | Cho et al. | 455/442 |
| 2006/0072678 | A1 | 4/2006 | Hadad | |
| 2007/0135109 | A1 * | 6/2007 | Walter et al. | 455/415 |
| 2007/0160017 | A1 * | 7/2007 | Meier et al. | 370/338 |
| 2007/0177510 | A1 * | 8/2007 | Natarajan et al. | 370/238 |
| 2007/0177545 | A1 * | 8/2007 | Natarajan et al. | 370/331 |
| 2007/0232358 | A1 * | 10/2007 | Sherman | 455/560 |
| 2007/0237093 | A1 * | 10/2007 | Rajagopalan et al. | 370/254 |

OTHER PUBLICATIONS

Koffman, "Broadband Wireless Access Solutions Based on OFDM Access in IEEE 802.16", IEEE Communications Magazine, Apr. 2002.
PCT International Search Report based on PCT/US07/09162 dated Jan. 2, 2008.

* cited by examiner

*Primary Examiner*—Jean A Gelin
(74) *Attorney, Agent, or Firm*—Chapin IP Law, LLC

(57) ABSTRACT

A wireless network including a plurality of base stations operating at a public spectrum frequency, each base station capable of generating an adjustable size coverage area. Each base station utilizing dedicating channels for each user to permit avoidance of one or more sources of interference. A server supplying data to the base stations, and managing billing and access to the wireless network.

29 Claims, 2 Drawing Sheets

INFRASTRUCTURE FOR WIRELESS TELECOMMUNICATION NETWORKS

FIELD OF THE INVENTION

The present invention relates to a system for a mobile broadband wireless access infrastructure extending across great distances that can operate in the licensed and unlicensed radio spectrum.

BACKGROUND OF THE INVENTION

Currently, the model of providing wireless telecommunication services involves mobile service providers expending enormous amounts of capital to acquire network infrastructure equipment, and licenses to use the Federal Communication Commission (FCC) regulated operating frequencies. These capital expenditures can result in increased consumer billing rates that can often inflate far above the actual cost of service.

In addition, the use of regulated licensed frequencies itself can be problematic, due to the lengthy, expensive, and uncertain regulatory review process. Oftentimes, the review process can be susceptible to political and commercial interests and pressures. For these same reasons, the regulatory review process can also be problematic, and difficult to navigate when a mobile service provider wishes to introduce new technologies and applications to the public.

In recent years, unlicensed frequencies, primarily in the 2.4 GHz range have been used for wireless LANs. Examples include Wi-Fi hot spots configured on a site-specific basis to provide on-site connectivity to access points. For the most part, the wireless LAN technologies do not have sufficient reach to extend beyond the site of the wireless network. Therefore, service may be often available only to a limited area within the relevant premises. For example, wireless LAN connectivity in a lobby, or business lounge of a hotel may not extend to the rooms on an upper floor or outside the building.

The end result of these limitations is a wireless broadband market that cultivates high consumer retail prices, while delaying the introduction and implementation of new technologies.

SUMMARY

The present invention provides in one embodiment, a wireless broadband network having a plurality of base stations that can operate at a public spectrum frequency. Each base station can allocate dedicated channels to one or more users for data transmission and to minimize interference. In one embodiment, each base station can be interspersed so that its coverage area, which can be adjustable in size, partially overlaps at least some of the adjacent coverage areas, thereby creating an expansive wireless broadband network, to which data can be transmitted, received, and managed.

The present invention, in another embodiment, provides a method of utilizing a wireless network to transmit and receive broadband data communications. The method includes providing a plurality of base stations that can operate at a public spectrum frequency, and causing the base stations to generate overlapping coverage areas thereby forming an expansive network. The base stations can also generate one or more channels, each of which can be dedicated to a particular user for data transmission, and to minimize interference within a coverage area. Users may be allowed to access the network at any point in the network, in order to transmit and receive data on a channel from a base station to adjacent base station along the network.

The present invention, in another embodiment, provides a method of billing wireless network subscribers. The method can include providing a plurality of base stations designed to operate at a public spectrum frequency. Each base station can generate overlapping coverage areas that are adjustable in size, so as to create an expansive network. Users may be allowed to access the network from within any coverage area in order to transmit and receive data. Each base station can generate one or more channels, which may then be assigned and dedicated to a particular user for data transmission and to minimize interference within the coverage area. Users may be monitored in order to credit all points of their network interaction and usage. Users can then be billed for their usage of the wireless network based on defined parameters, which may include user airtime, per content view, or by download.

In another embodiment of the present invention, a cellular system of a user may be polled via the base stations to determine a home network access point of the user. Thereafter, the user may be billed for network usage taking into account, whether the network access occurred in the home network area or from a remote access point.

DESCRIPTION OF SPECIFIC EMBODIMENTS

Figure 1:
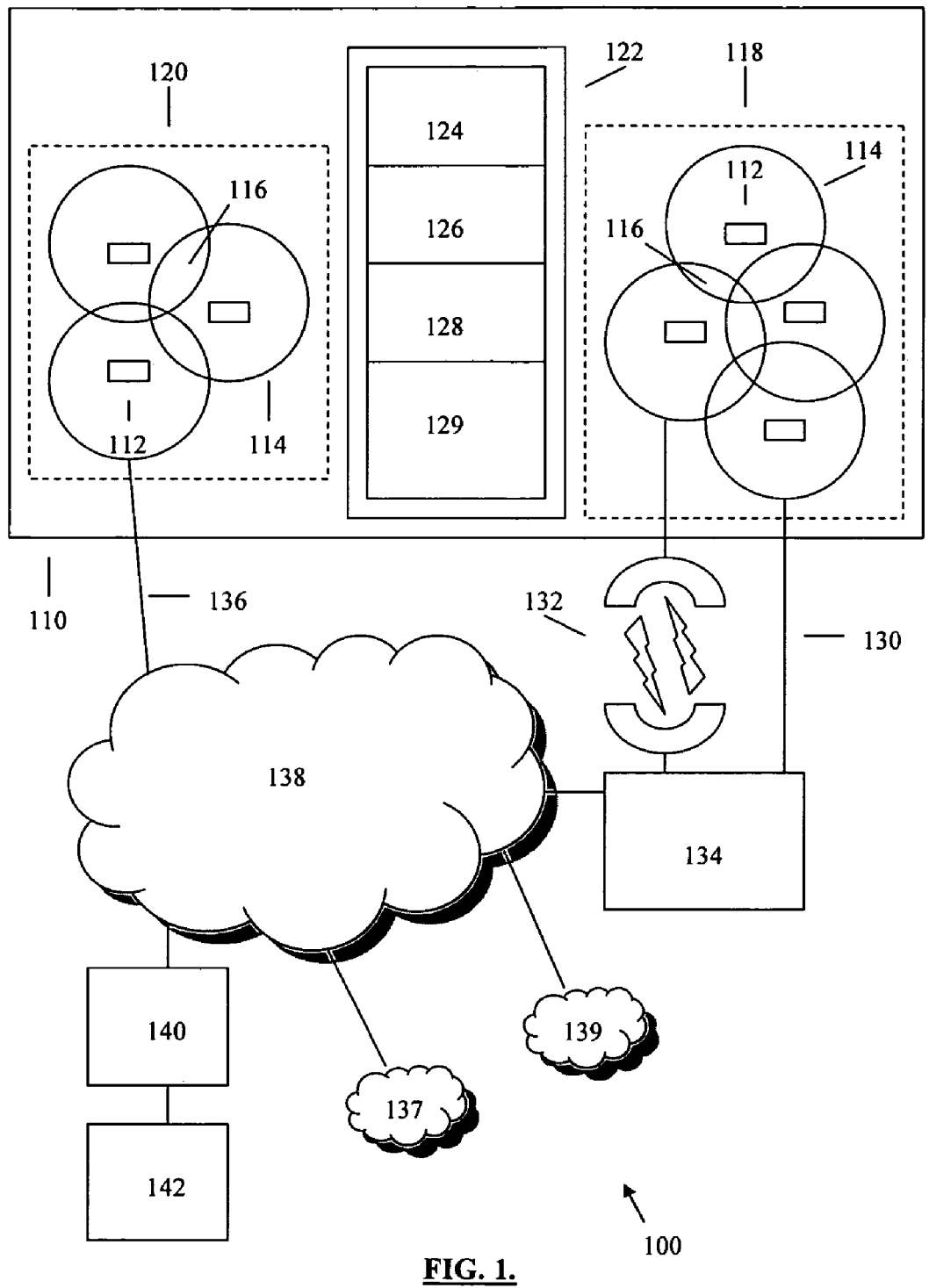
FIG. 1 illustrates a system architecture and accompanying interfaces, in accordance with an embodiment of the present invention.

In the present invention, a solution is presented that can reduce the foregoing limitations, and provide the public with a more affordable, robust, and accessible, wireless broadband access service that can be platform independent. This objective may be achieved by introducing a technical specification for building a network infrastructure that can enable national convergence of, for example, voice over IP, video mobility, Internet access from any location, and TV access on a desktop computer or laptop.

The disclosed technology can operate in the licensed and unlicensed radio spectrum. However, in one embodiment, the disclosed technology utilizes the public domain (unlicensed) spectrum, and avoids interference with other public domain spectrum users.

In general, the disclosed technology calls for "weaving" a wireless broadband network together from a plurality of base stations deployed in existing locations, e.g., businesses, telephone poles, towers, and operating in the unlicensed frequency spectrum. The use of unlicensed frequencies, in one embodiment, can avoid the heavy costs of frequency acquisition. This, together with the relatively low cost of base stations reduces infrastructure costs significantly and would enable the granting of services at low retail prices.

Underlying Technology

To implement the network for use in connection with the present invention, in an embodiment, WiMax technology may be used. In particular, WiMax in one embodiment, includes the IEEE 802.16 a/e/d broadband point-to-multipoint wireless access standards. These standards may be commonly referred to as fixed WiMax (802.16a-d), and mobile WiMax (802.16e). Optimal WiMax operating conditions with respect to range and broadband applications require a spectrum range of 2.0 GHz-2.4 GHz or higher.

In one embodiment of the present invention, the underlying technology can be based on Orthogonal Frequency Division Multiple Access (OFDMA), which originated from CDMA technology, and supports wireless broadband communications across a variety of platforms, e.g., cellular, broadband wireless access (BWA). OFDMA is the preferred solution for the IEEE 802.16a/e/d Broadband Wireless Access standards.

The OFDMA technology, in an approach, can sub-divide high-speed data signals into, for example, multiple lower speed signals. This can result in increased tolerance to noise and minimize interference caused by multi-path transmission of signals which may be created by chance obstructions in the path of a signal. At the same time, this sub-division can enable efficient use of bandwidth allocation. In other words, OFDMA can provide wide-area, multi-point coverage along with a multiplicity of high-speed channels over a single frequency band.

OFDMA can further divide a signal into sub-channels, with each sub-channel being allocated to a different subscriber. Sub-channeling in WiMax, in an embodiment, allows multiple users to transmit, for instance, on the uplink with substantially similar aggregate transmission rate as for instance, the downlink. Each subscriber, in an embodiment, can be treated separately independent of location, distance from the base station, interference and power requirements. In addition, various modulations can be used for each of the carriers in the system to provide improved coverage and throughput, e.g., QPSK, 16QAM, 64QAM, 256QAM.

OFDMA technology can also be modified, in accordance with an embodiment of the present invention, to provide real wireless broadband mobile services. This elusive combination of wireless broadband with true mobility is considered by many in the industry as an ultimate goal which embodies the convergence of the various technologies and media. It should be emphasized that the capabilities of OFDMA by far exceed those of cellular 3G (third generation technologies) in terms of uplink and downlink speed, mobile speed, etc., and are actually considered 4G technology (providing for speeds of up to 1 megabit for devices traveling at up to 60 kilometers per hour).

In addition, OFDMA-based products can be compatible with "smart antenna" technologies (e.g., antenna array beamforming, antenna diversity at base stations and subscriber stations) that can enhance the signal penetration even in the harshest environments.

An embodiment of the invention will now be described by way of non-limiting example, and with reference to the accompanying drawings.

In one embodiment of the invention shown in FIG. 1, a network provider 110 such as a WiMax network provider, manages at least two WiMax networks 118, 20. Each of the networks 118, 120 may include a plurality of base stations 112. Each base station 112 may be designed to include a WiMax (IEEE 802.16 a/e/d) radio, and enabling architectures for mobile broadband radios in both the unlicensed public domain radio spectrum (e.g., 2.4 GHz) and in the licensed frequency bands. Therefore, each base station can be capable of operating in both licensed and unlicensed spectrums.

Figure 2:
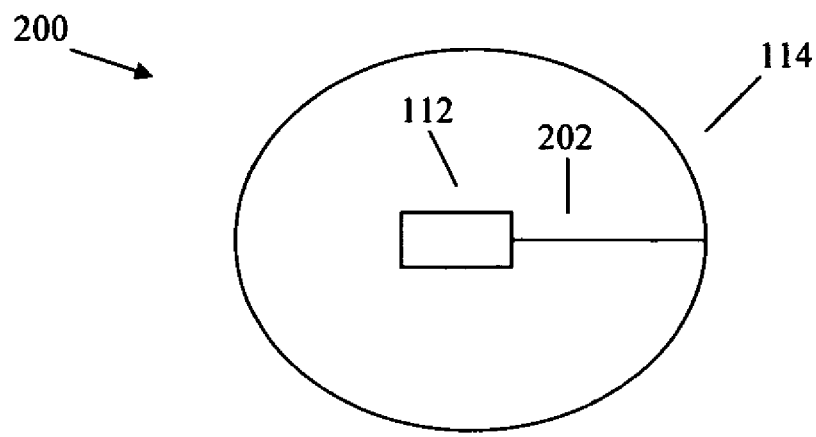
FIG. 2 illustrates a base station and network cell for use in connection with the present invention.

With reference to FIG. 2, a base station 112 in one embodiment, can be designed to transmit a signal to create a network cell 114. The size of the network cell 114, as defined by the coverage range radius 202, can vary depending on the output power of the base station 112 transmission. For example, if the base station transmits in the unlicensed public spectrum at 2.4 GHz and 1 watt (due to FCC restrictions on signal strength) the coverage range radius 202 can be up to 1.5 km. However, if the same base station 112 transmits in the licensed spectrum at high power, the coverage range radius 202 can be up to 50 km. To that end, larger network cells 114 can be created by high power signal transmission, resulting in widespread access and less base stations 112.

Figure 3:
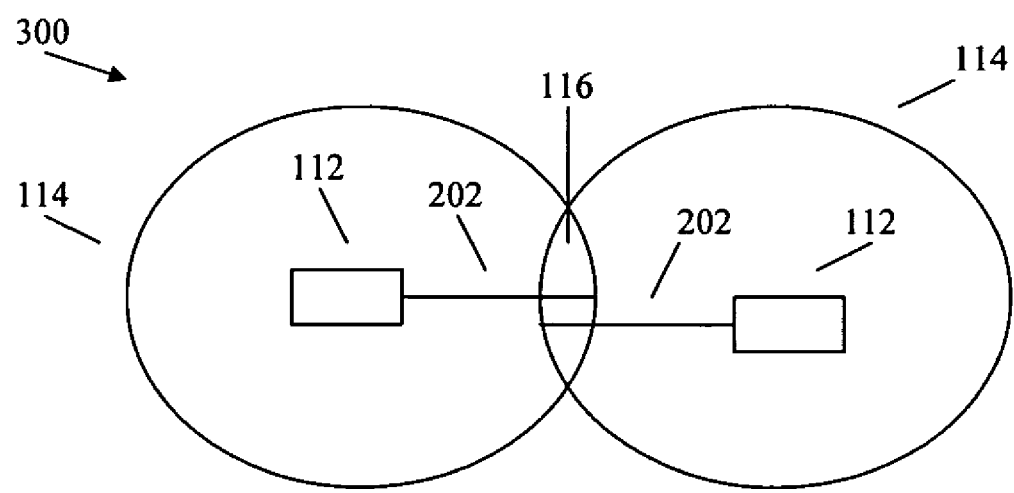
FIG. 3 details an aggregation of cells in which the overlapping cell regions provide partial redundant coverage thereby forming a wireless network cluster.

Each base station 112, in an embodiment, can be deployed, for instance, on ground level or on existing infrastructure. For example, in cities, tall buildings and towers can be utilized. In rural settings, buildings, ground-level platforms, and telephone poles can suffice. Referring now to FIG. 3, each base station 112 may be deployed in the vicinity of other base stations 112, such that their respective network cells 114 partially overlap one another, thereby creating a redundant coverage region 116. This redundant coverage region 116 essentially merges the respective network cells 114, thereby forming a single, expansive, broadband WiMax network 300. In an embodiment, such an expansive WiMax network having enough network cells 114 and redundant coverage regions 116, can provide coverage for the entire United States.

Referring again to FIG. 1, by interspersing the base stations 112, so that adjacent network cells 114 overlap, redundant coverage regions 116, may be created, so that a WiMax network 118, 120 can be expanded and can completely blanket a particular area, e.g., United States, Europe. For example, a rough estimate of the required number of base stations 112 to cover and provide coverage to the entire United States can be from about 30,000 to about 40,000.

As discussed above, the WiMax networks 118, 120 can simply be an aggregation of the network cells 114 generated by the interspersed base stations 112. The present invention, in an embodiment, can be designed to minimize interference in a public frequency spectrum, e.g., 2.4 GHz. Interference can be caused by many sources including multipath reflections, jitter, and cross-talk.

In particular, a chip set and algorithm can be provided that senses the public interference, and prevents its interaction by interleaving around the potential interference, interpolation, or hopping to another available access point. More, specific technical details on attributes (interference avoidance, OFDMA sub-channeling) of the system are elaborated in the published patent applications: 20060072678 System and method for cellular communications, 20050207446 Synchronization system and method, 20050207334 OFDM communication channel, 20050025042 Bi-directional communication channel, 20050002323 Cellular network system and method, 20040224691 Handoff system and method, 20020085645 Bi-directional wireless communication, all of which are hereby incorporated by reference.

Multipath interference caused by signal reflections that may be out of phase, can also be mitigated by traditional methods, such as rake receivers as well as by using antenna array beamforming, antenna diversity at the base station and at the subscriber station.

The networks 118, 120 can further provide decentralized network coverage, control, and services. In particular, each base station 112, by design, can operate independently of the other base stations 112. As such, the service provider 110 can supply separate data for each base station 112. Such a format allows a higher level of reliability and access during system failures. For example, if a base station 112 fails, its respective network cell 114 can no longer exist. As a result, users in that network cell 114 may lose service. However, the remaining independently operating base stations 112 may remain unaffected and stay operational. The overall network 118, 120 consequently remains intact.

Network users located in the redundant coverage regions 116 of the failed cell 114 may also remain unaffected, because adjacent cells 114 support service in the redundant coverage regions 116. Specifically, users located in redundant coverage regions 116 essentially can receive support from multiple base stations 112. For example, if a user is located in a redundant coverage region 116 made up of three overlapping cells 114, there are three base stations that can provide coverage to that location. Based on quality of service criteria, one of the three base stations 112 will service the user. Continuously during this process, user equipment (cell phone, laptop, etc.) and base stations 112 interact through polling to assure that the quality of service criteria are maintained. If the quality of the connection deteriorates below a threshold, a soft handoff to another base station meeting the quality of service criteria may be performed.

Therefore, when one cell 114 fails, the user equipment being utilized to interface with the failed base station 112 and the surrounding base stations 112, sense the failure, and a soft handoff to the nearest base station 112 having acceptable quality of service criteria is performed. The transition can be seamless. For those network users that do lose service due to the failure of the base station 112, they need only to move into the nearest network cell 114 to regain service.

In accordance with one embodiment of the present invention, a WiMax network 118 can be connected to, for instance, the Internet 138 by a DSL/cable modem 130 or microwave link 132, through a local Internet Service Provider (ISP) 134, in order to gain access to remote networks or cell phone systems. However, a WiMax network 120 can also have a direct connection 136 to the Internet 138 to accomplish similar results. It should be noted that every base station 112 in the networks 118, 120 may not have to be connected the Internet 138. In fact, the connectivity to the Internet 138 of one base station 112 in networks 118, 120 can be through another base station 112 in the same respective network 118, 120.

Internet connectivity can be important, because it provides a method of linking remote networks. For example, in FIG. 1, WiMax network 118 and WiMax network 120 may be isolated from each other. As such, a wireless user in network 118 may communicate with another wireless user in network 120 by using the Internet 138.

Specifically, the user in network 118 can connect to the Internet by DSL/cable modem 130 or microwave link 132, through an ISP 134 and into the Internet 138. The data can then be transferred via direct connection 136 to WiMax network 120, and the appropriate wireless recipient in cell 114. Through this method, broadband data, e.g., voice over IP, video, data streams, Internet access, TV, can be routed to and from remote networks 118, 120 via the Internet 138.

In addition, using this system architecture 100, cellular phone communications can be accomplished, thereby minimizing the need for satellite links and cell towers. For example, instead of a cell phone linking up to a nearby cell tower, it senses the nearest local base station 112 in a WiMax network and connects. The call can then be transferred via direct connection 136, or through an ISP 134 to the Internet 138, and then onto the cellular operator's gateway 140 and into the phone system 142.

The disclosed technology delivers seamless broadband data connections. Users can transition and communicate between network cells 114 and across entire networks 118, 120 seamlessly. A user in a network cell 114 can communicate with another user located in a network cell 114 on an opposite end of the WiMax network 118. Moreover, real-time video transfers to vehicles moving at highway speeds through the network 118 can be achieved. The sensing and hopping over other public users allows instant ad-hoc connectivity of the users amongst themselves in real-time.

In addition, the users can connect to the WiMax network 118 from any point in the network with a variety of communication peripheral devices, e.g., cellular handsets, PDA, laptops, digital TV converters. For example, assuming the entire United States had WiMax network coverage, a user accessing a cell 114 in Miami, Fla. with a cell phone or laptop can communicate with users and access services anywhere in the network, e.g., Seattle, Boston.

Further, as a result of the network's interwoven network fabric, fast tracking can be readily available without the need of GPS satellites. Therefore, an additional benefit of the invention can be that it provides for a cost effective way to build a more efficient telephony, and Internet network in the public domain. Such a system can then be operated in the licensed spectrum resulting in much stronger and efficient coverage.

Billing Clearinghouse & Network Management

The system architecture 100 also comprises a billing and network management system 122, which can be operated by, for instance, the service provider 110, or can be outsourced to a third party vendor. The actual services that can be provided include billing data collection 124, Internet interfacing 126, network access management 128, and billing clearinghouse and settlement services 129.

As discussed above, the service provider 110 can supply separate data for each base station 112 in the WiMax networks 118, 120. In one embodiment of the invention, each base station 112 can be located in, for instance, a business or establishment of a licensee, e.g., McDonalds, Starbucks, Marriot. However, since a user can gain access to the networks 118, 120 at any base station 112 in the networks 118, 120, and since there can be a substantial amount of coverage overlap for each base station 112 (especially in cities), a sophisticated billing clearinghouse system 129 can be utilized to handle billing. The billing clearinghouse system 129 may credit all points of user-network interaction, subtract out duplicate charges, and divide revenues in the redundant coverage regions 116. Such a clearinghouse system 129 can be acquired as a turnkey solution from, for instance, Elgadcom Group in Azur, Israel or its subsidiary FTS Company, which specializes in billing and customer care solutions for wireline and wireless operators.

In an embodiment, the network management system 122 can retrieve user information from the base stations 112. This information can, for instance, identify the home networks of users. The information can be acquired during the polling process (described above) that occurs between the cellular systems of a user and base stations 112, while a user is in the WiMax networks 118, 120. If a remote connection must be made for the user, the information can then be used to connect the user through that home network 137 rather than through another Internet accessible network 139. This allows the user to utilize remaining minutes from a home pool instead of a roaming pool of minutes. In addition, users accessing the WiMax network 118 who are actually subscribers of WiMax network 120 may automatically be charged an amount that reflects the percentage use in network 118, and maybe a percentage allocated to the subscriber home WiMax network 120.

The service provider 110 can also supply network access management 128. Network users can purchase pre-paid access cards, or can charge their credit card in order to gain an access key. The access key can then be used to enter the networks 118, 120. Users can be billed by airtime, per content view, or download.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

I claim:

1. A wireless network comprising:
    a plurality of WiMAX base stations operating at a public spectrum frequency, each base station designed to operate in accordance with the IEEE 802.16e standard;
    a plurality of overlapping coverage areas, each coverage area being generated by a base station so as to create an expansive Wide Area Network (WAN);
    one or more channels generated by each base station, each channel having a plurality of Orthogonal Frequency Division Multiple Access (OFDMA) sub-channels, each sub-channel being dedicated to a particular user for data transmission and to minimize interference within the coverage area, the base stations minimizing interference by interleaving around the interference; and
    a processor to permit billing data collection, Internet interfacing, clearinghouse and settlement services.

2. A wireless network of claim 1, further comprising a server for managing access to the wireless network.

3. A wireless network of claim 2, wherein the server is designed to manage data content along the network.

4. A wireless network of claim 1, wherein the wireless network can be linked to one or more remote networks by Internet connection.

5. A wireless network of claim 4, wherein the Internet connection is made by direct connection between the wireless network and the Internet.

6. A wireless network of claim 1, wherein the wireless network is a broadband network.

7. A wireless network of claim 1, wherein the public spectrum frequency is 2.4 GHz.

8. A wireless network of claim 1, wherein each coverage area acts as an entry point into the wireless network for any communication device.

9. A wireless network of claim 1, wherein the coverage area includes a radius ranging from about 1.5 km to about 50 km or more.

10. A wireless network of claim 1, wherein the base station includes one of rake receivers, antenna beamforming arrays, diversity antennas, or combination thereof to minimize interference.

11. A wireless network of claim 1, wherein the base station includes a transceiver to permit transmitting and receiving a plurality of broadband media.

12. A method of transmitting and receiving data in a wireless network, the method comprising:
    providing a plurality of WiMAX base stations operating at a public spectrum frequency, each base station designed to operate in accordance with the IEEE 802.16 standard;
    causing the base stations to generate overlapping coverage areas, so as to create an expansive Wide Area Network (WAN);
    allowing users to access the network from a coverage area;
    permitting the base stations to generate one or more channels, each channel having a plurality of Orthogonal Frequency Division Multiple Access (OFDMA) sub-channels, each sub-channel being dedicated to a particular user for data transmission and to minimize interference within the coverage area, the base stations minimizing interference by interleaving around the interference;
    transmitting data on a channel from a base station to adjacent base stations along the network; and
    providing a server for supplying separate content to each station, the server further providing billing data collection, Interfacing, clearinghouse and settlement services.

13. A method of claim 12, wherein the base stations minimize interference by utilizing interpolation.

14. A method of claim 12, wherein the base stations minimize interference by sensing the interference and hopping to another available access point.

15. A method of claim 12, wherein the base stations transmit and receive a plurality of broadband media.

16. A method of claim 12, wherein the clearinghouse and settlement services include crediting all points of user-network interaction, subtracting out duplicate charges, and dividing revenues in redundant coverage regions.

17. A method of claim 12, wherein the user is billed by airtime, per content view, or by download.

18. The method of claim 12 further comprising selecting a transmission frequency in the unlicensed spectrum, the unlicensed frequency spectrum providing a high power signal transmission for use by a base station, the high power signal greater than that of the licensed frequency spectrum.

19. The method of claim 18 further comprising performing interference mitigation including at least one of interpolation or access point hopping to avoid interference in the unlicensed frequency spectrum, hopping performed by maintaining alternating sectors free for WiFi transmissions or by alternating from one frequency to another.

20. The method of claim 19 wherein the unlicensed frequency spectrum includes bandwidths of 2.4 GHz, 3.65 GHz, or 5.7 GHz.

21. The method of claim 20 further comprising itemizing usage in coverage areas such that billing is performed on a per coverage area level of granularity, the coverage area defined by each base station and access point.

22. A method of billing subscribers in a wireless network, the method comprising:
    providing a plurality of WiMAX base stations, operating at a public spectrum frequency, each base station designed to operate in accordance with IEEE 802.16e standard and capable of generating overlapping coverage areas, so as to create an expansive network;
    allowing a user to access the network from within a coverage area to transmit and receive data;
    permitting the base stations to generate one or more channels, each channel having a plurality of Orthogonal Frequency Division Multiple Access (OFDMA) sub-channels, each sub-channel being dedicated to a particular user for data transmission and to minimize interference within the coverage area, the base stations minimizing interference by interleaving around the interference;
    monitoring each user, so as to credit all points of user-network usage;
    billing each user for usage of the wireless network based on defined parameters.

23. A method of claim 22, wherein the base stations minimize interference by utilizing interpolation.

24. A method of claim 22, wherein the base stations minimize interference by sensing the interference and hopping to another available access point.

25. A method of claim 22, wherein the base stations transmit and receive a plurality of broadband media.

26. A method of claim 22, wherein the defined parameters include airtime, per content view, or download.

27. A method of claim 22, wherein the monitoring step further provides billing data collection, Internet interfacing, clearinghouse and settlement services.

28. A method of claim 27, wherein the clearinghouse and settlement services include crediting all points of user-network interaction, subtracting out duplicate charges, and dividing revenues in redundant coverage regions.

29. A method of claim 27, wherein the user is billed by airtime, per content view, or by download.

* * * * *